(12) United States Patent
Harrison

(10) Patent No.: US 12,314,823 B2
(45) Date of Patent: May 27, 2025

(54) SYSTEMS AND METHODS FOR FACILITATING DATA INTERPRETATION

(71) Applicant: Tybram, LLC, Jacksonville, FL (US)

(72) Inventor: Marriel Harrison, Jacksonville, FL (US)

( * ) Notice: Subject to any disclaimer, the term of this patent is extended or adjusted under 35 U.S.C. 154(b) by 0 days.

(21) Appl. No.: 18/372,016

(22) Filed: Sep. 22, 2023

(65) Prior Publication Data

US 2025/0103942 A1 Mar. 27, 2025

(51) Int. Cl.
G06N 20/00 (2019.01)
(52) U.S. Cl.
CPC .................................... G06N 20/00 (2019.01)
(58) Field of Classification Search
CPC ............ G06N 5/04; G06N 20/00; G06N 3/08;
G06N 5/022; G08G 5/0026; G09B 9/08;
G09B 9/00; G09B 19/165; G09B 9/12;
G09B 9/02; G09B 9/24; G09B 9/165;
G09B 9/10; G09B 5/06; G09B 9/003;
G09B 19/00; G09B 5/00; G09B 7/04;
G06F 30/20; G06F 3/0482; G06F 3/013;
G06F 30/15; G06F 3/016; G06F 40/30;
G06F 17/18

See application file for complete search history.

(56) References Cited

U.S. PATENT DOCUMENTS

| 11,810,478 | B1* | 11/2023 | Richter | .................... G06N 7/01 |
| 2022/0139252 | A1* | 5/2022 | Sawyer | ................. G09B 9/165 |
| 2022/0335850 | A1* | 10/2022 | Klassen | ................. G06N 3/049 |

* cited by examiner

*Primary Examiner* — Hau H Hoang
(74) *Attorney, Agent, or Firm* — Wilson Dutra, PLLC; Camille A. Wilson

(57) ABSTRACT

The present disclosure provides generally for systems and methods for facilitating data interpretation. In some aspects, a data-interpretation system includes a data source and an artificial-intelligence (AI) infrastructure. In some implementations, the AI infrastructure is trained to predict outcomes based on data received from the data source, wherein the predicted outcome forms the basis of at least one data interpretation subsequently generated by the data-interpretation system. In some examples, the data interpretation is presented to a user in the form of a simplified textual or graphical representation that allows the user to understand the data interpretation without requiring specialized knowledge or training.

5 Claims, 11 Drawing Sheets

230

235

| Flight ID | Altitude (ft) | Air Speed (knots) | Vertical Speed (fpm) | Pitch (deg) | Roll (deg) | Yaw (deg) | Evasive Manuevers |
|---|---|---|---|---|---|---|---|
| # | 10000 | 350 | 0 | 0 | 0 | 0 | 1 |
| # | 15000 | 400 | 500 | 10 | 0 | 0 | 2 |
| # | 9000 | 375 | -250 | -5 | 0 | 0 | 0 |
| # | 12000 | 325 | 0 | 0 | 0 | 0 | 3 |
| # | 10000 | 350 | 250 | 5 | 0 | 0 | 1 |

FIG. 2

SYSTEMS AND METHODS FOR FACILITATING DATA INTERPRETATION

BACKGROUND

"Training" is the process of developing the knowledge and skills of an individual to increase and enable performance of certain tasks and abilities. Since pre-historic times, humans have trained new generations to prepare them for adulthood. In addition, training has always been heavily utilized to ready and improve the workforce for any type of occupation. Depending on the job, there may be a different amount of training required to sufficiently prepare an individual for competency. While education works to train the youth and prepare them to enter the workforce, most jobs still require a training period to ensure new workers are equipped to perform their duties. It is not uncommon for these periods of training to last from a few days to a few months, depending on the role.

Before computers, the vast majority of training was conducted in-person. Businesses had to expend not only resources but valuable time to properly train any newcomers to the organization. With the development of technology, training has become easier and more adaptable. Online training programs and videos have been integrated into the modern workplace to allow new workers to learn on their own and with minimal hands-on practices. Remote onboarding has allowed businesses to provide a detailed training regimen without slowing down their overall productivity. As technology continues to develop, more opportunities for strong and efficient training evolve with it.

Artificial Intelligence ("AI") is technology that performs tasks that typically require human intelligence. AI has led to machines that are capable of decision-making, audio recognition, visual perception, and other human abilities. AI technology is driven by algorithms, step-by-step instructions on how and when the machine should operate and how the machine can learn to operate on its own. Like the human brain, AI learns from the information that it processes, with the programming-equivalent of "understanding" developing as it is trained with proper and sufficient data.

AI technology is rapidly expanding in modern-day business, helping and strengthening current systems and solutions to create a more efficient and effective workplace. However, AI has yet to be implemented in training scenarios, thereby causing a significant amount of human involvement to remain as instructors, teachers, or mentors are needed to interpret student or trainee performance and provide constructive feedback. This can be particularly costly when it comes to occupations where training is a high barrier to entrance. For example, training for specialized occupations such as pilots, truck drivers, heavy-equipment operators, and operators of other specialized vehicles can be incredibly time-consuming. If AI technology could adapt and be applied to such training programs, it could create more effective and ready workers while requiring less time and money.

SUMMARY OF THE DISCLOSURE

What is needed are systems and methods for facilitating data interpretation. In particular, systems and methods that facilitate the interpretation of data associated with user training, education, and/or learning are desired.

In some aspects, the present disclosure is directed to a data-interpretation system that includes a data source and a computing device communicatively coupled via at least one network connection. In some embodiments, the data-interpretation system further comprises an artificial-intelligence infrastructure configured to determine one or more predicted outcomes based on data received from the data source.

In some implementations, the present disclosure is directed to a method for facilitating data interpretation. In some aspects, the method includes receiving data from a data source; processing the data via an artificial-intelligence infrastructure; and determining at least one predicted outcome via the artificial-intelligence infrastructure, wherein the at least one predicted outcome is at least partially based on the data.

A number of embodiments of the present disclosure will be described. While this specification contains many specific implementation details, these should not be construed as limitations on the scope of what may be claimed, but rather as descriptions of features specific to particular embodiments of the present disclosure. It is understood to those skilled in the art that variations, modifications, and alterations may be apparent. It will be understood that various modifications may be made without departing from the spirit and scope of this disclosure.

BRIEF DESCRIPTION OF THE DRAWINGS

The accompanying drawings, which constitute a part of this specification, illustrate several embodiments of the disclosure and, together with the description, serve to explain the principles of the disclosure.

FIG. 2 is a two-dimensional table displaying an example of data that may be received from a data source of the data-interpretation system of FIG. 1, according to some embodiments of the present disclosure.

DETAILED DESCRIPTION

Figure 1:
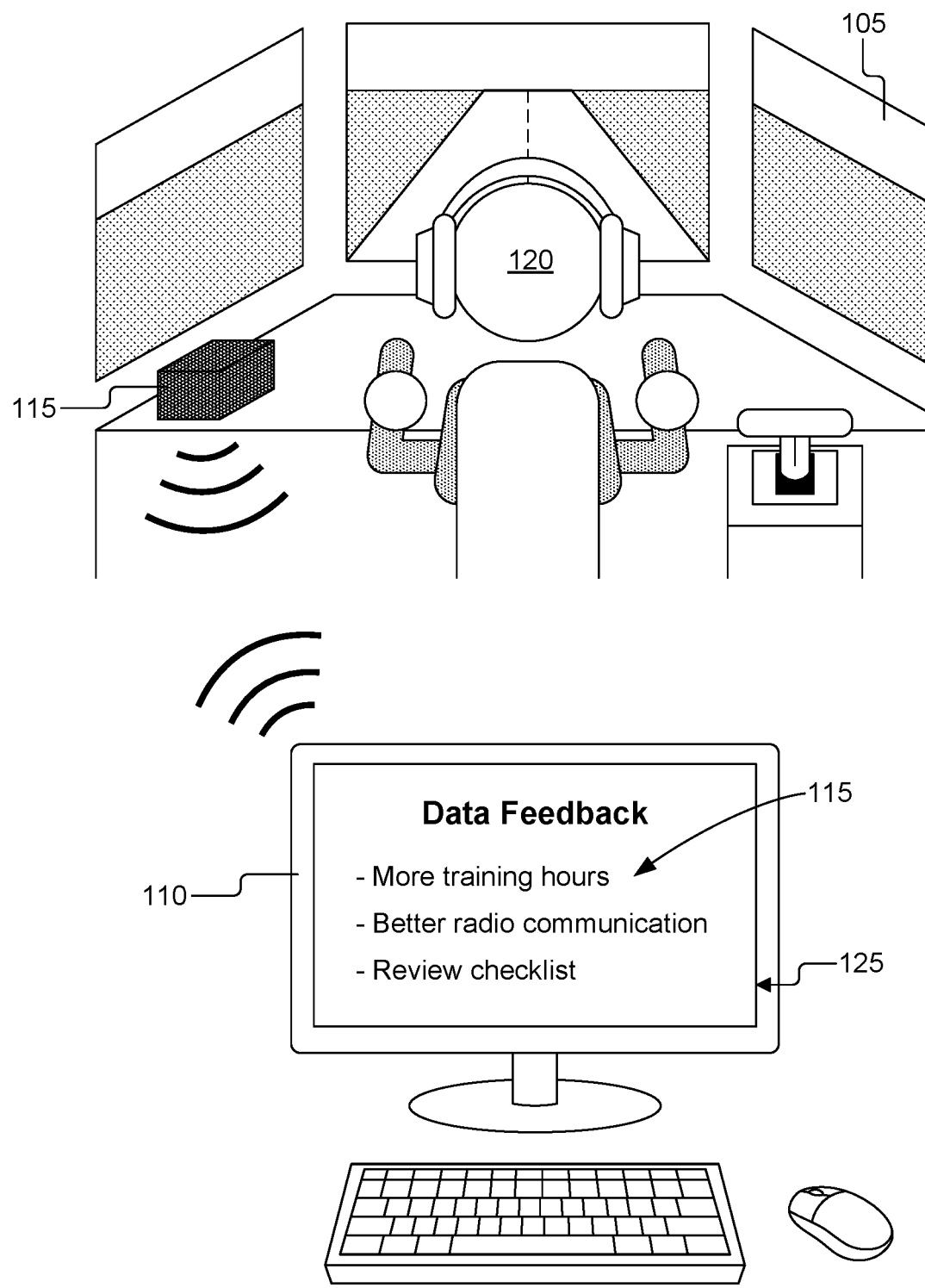
FIG. 1 is a conceptual diagram of an example data-interpretation system, according to some embodiments of the present disclosure.

The present disclosure provides generally for systems and methods for facilitating data interpretation. According to the present disclosure, a data-interpretation system includes a data source communicatively coupled to a computing device. In some aspects, the data-interpretation system also includes a data collector configured to aggregate or compile data from the data source. In some implementations, a transmitting device is configured to transmit data from the data source and/or the data collector to the computing device.

In some aspects, the data-interpretation system includes one or more coded instructions or algorithms configured to interpret data obtained, either directly or indirectly, from the data source. In some implementations, the coded instructions or algorithms are at least temporarily stored within a storage medium, such that the coded instructions or algorithms may be subsequently retrieved and executed by a processor of the computing device, the data collector, or one or more other components of the data-interpretation system. In some examples, the data-interpretation system includes an artificial-intelligence infrastructure configured to perform or execute one or more machine-learning or artificial-intelligence operations, processes, or calculations on data received from the data source. In some aspects, the artificial-intelligence infrastructure is configured to form, generate, determine, or compute one or more predictions or possible outcomes based on data received from the data source, wherein the predictions may be used to generate and present one or more assessments or interpretations of the received data.

In the following sections, detailed descriptions of examples and methods of the disclosure will be given. The descriptions of both preferred and alternative examples, though thorough, are merely non-limiting examples, and it will be understood to those skilled in the art that variations, modifications, and alterations may be readily apparent. It is therefore to be understood that the examples do not limit the broadness of the aspects of the underlying disclosure as defined by the claims.

GLOSSARY

Data source: any electronic or computing device capable of generating, transmitting, storing, or relating data. By way of example and not limitation, a "data source" may be or may include a computer configured to execute a flight simulator, a training program, or an educational course.

Artificial-intelligence infrastructure: any electronic or computing system configured to execute or perform one or more machine-learning or artificial-intelligence algorithms, processes, operations, functions, or calculations. By way of example and not limitation, an artificial-intelligence infrastructure may comprise a neural network, a deep neural network, or a support-vector machine.

Training program: any apparatus, machine, data, instructions, algorithm, system, course, content, materials, or similar tool, mechanism, or resource that may be used to train, teach, or otherwise educate at least one user. By way of example and not limitation, a training program may at least partially comprise a simulator, courseware, or both.

Courseware: any type of educational or training content, materials, or resources, such as one or more lessons, assessments, or activities that may be delivered, accessed, provided, or otherwise made available in an electronic format or configuration.

FIG. 1 is a conceptual diagram of an example data-interpretation system 100, according to some embodiments of the present disclosure. In some aspects, the data-interpretation system 100 includes a data source 105 and at least one computing device 110, wherein the data source 105 is communicatively coupled to the computing device 110 such that the computing device 110 can receive data from the data source 105. For instance, the data source 105 may be communicatively coupled to the computing device 110 via a network connection, such as the Internet or a local-area network (LAN), or via a short-range wireless connection or near-field communication protocols.

In some implementations, the data-interpretation system 100 includes a data collector 115. Data collector 115 is an electronic or computing device configured to aggregate or compile data collected, gathered, received, or otherwise obtained from the data source 105. In some embodiments, compiling the data may help prepare the data for transmission and/or analysis, wherein the transmission or analysis process may be streamlined by facilitating bulk transmission or pre-analysis of data.

In some aspects, the data interpretation system 100 includes coded instructions or algorithms configured to execute, perform, or carry out one or more operations, functions, processes, or calculations on data received or obtained from the data source 105. In some non-limiting exemplary implementations, the coded instructions or algorithms may be at least temporarily stored within a computer-readable storage medium such that the coded instructions or algorithms may be subsequently accessed, retrieved, and executed by a processing device communicatively coupled to the storage medium. The storage medium and/or the processing device may be integrated within any or all of: the computing device 110, the data collector 115, the data source 105, or other components of the data-interpretation system 100. In some aspects, the coded instructions or algorithms may be configured as a software application that may be accessible by the computing device 110 via one or more servers or downloaded to a storage medium of the computing device 110 from the servers.

In some implementations, the data-interpretation system 100 includes an artificial-intelligence (AI) infrastructure. In some non-limiting exemplary embodiments, the AI infrastructure may be at least partially configured within at least a portion of one or more of: the computing device 110, the data collector 115, the data source 105, or one or more other portions or components of the data interpretation system 100. The AI infrastructure can include a neural network, a deep neural network, and a support-vector machine, as non-limiting examples.

The AI infrastructure of the data-interpretation system 100 is configured to execute, perform, implement, or carry-out one or more machine learning, artificial intelligence, or similar analytical or computational functions, operations, processes, or calculations. For instance, the AI infrastructure can receive data, either directly or indirectly, from the data source 105 and determine one or more predictions or outcomes based on the received data. In some embodiments, the AI infrastructure may be configured to use the predictions or outcomes to generate an interpretation of the received data, such as an assessment, evaluation, or summary of the data.

In some implementations, the AI infrastructure is configured to generate a presentable representation 115 of the data interpretation. By way of example and not limitation, the representation may at least partially comprise one or more of: a semantic, graphical, or image-based representation 115 of the data interpretation that may be presented to one or more users 120 via at least one graphical user interface (GUI) 125 generated and presented by the computing device 110. As a non-limiting illustrative example, the representation 115 of the data interpretation may at least partially comprise one or more words or phrases. In some embodiments, the AI infrastructure may be configured to generate a representation 115 comprising one or more words or phrases that may be understood by a layperson with little or no specialized or technical training. In some implementations, this may enable a user 120 of the data-interpretation system 100 to receive and understand an interpretation of data received from the data source 105 without being required to possess specialized knowledge or skills pertaining to how to read and understand the raw form of the data.

The AI infrastructure may be iteratively trained to generate data interpretations and representations 115 associated therewith with ever-improving efficiency, accuracy, or clarity. In some non-limiting example implementations, the AI infrastructure may be trained using one or more of: a supervised machine-learning process, an unsupervised machine learning process, or a semi-supervised machine-learning process. In some embodiments, the performance (e.g., accuracy) of the AI infrastructure may progressively improve in correlation to the amount of training data received.

The computing device 110 may be located proximate to the data source 105, within the general vicinity of the data source 105, or remotely from the data source 105. The computing device 110 may comprise one or more of: a desktop computing device, a laptop computing device, a tablet computing device, a smartphone, a smart watch, one or more servers, and/or a gaming console, as non-limiting examples. In some embodiments, the data-interpretation system 100 includes a plurality of computing devices 110. For instance, the data-interpretation system 100 may comprise a first computing device in the form of a desktop computer 110, and a second computing device in the form of one or more remote servers comprising at least one AI infrastructure configured to analyze and interpret data from the data source 105 and transmit the interpretation to the desktop computer 110 via a network connection.

In some aspects, the data-interpretation system 100 may be configured to assess or interpret data related to one or more educational, training, or similar learning programs. By way of example and not limitation, the computing device 110 may be configured to receive data obtained from at least one data source 105 that comprises a computer executing: a simulator, a class, course, activity, exercise, test, or quiz; or a computer-readable medium storing one or more test, quiz, or simulator performance results. In some implementations, a computing device of the data interpretation system 100 is configured to analyze, interpret, assess, or evaluate data received from the data source 105 and generate one or more representations 115 of the interpreted data that may be presented to a user in a straightforward, simplified, or otherwise easily understood format such that a student, trainee, amateur, novice, or similar user 120 may receive real-time performance or progress feedback without requiring the assistance or input of a specialized instructor, teacher, professor, or mentor. In some aspects, this may help the user 120 progress at a faster rate by receiving feedback that is directed or personalized to the user 120, or by receiving feedback more often at more frequent intervals due to not having to wait for the availability of a specialized instructor or teacher.

As a non-limiting illustrative example, a data source 105 may comprise a computer executing a simulator program used to train a user 120 to operate a vehicle or machinery. By way of example and not limitation, the data source 105 may comprise a computer executing a flight-simulator program used to train pilots, such as for the Air Force or for commercial flight. In some aspects, the flight-simulator program may record one or more various types of data comprising one or more various flight parameters during the duration of the simulation to monitor a pilot's performance, including but not limited to: an identification number for the flight simulation, aircraft altitude, aircraft air speed, aircraft heading, aircraft vertical speed or change in altitude rate, aircraft pitch, aircraft roll, aircraft yaw, experienced G-forces, percentage of afterburner usage during the flight, number of midsole launches during the flight, number of training hours previously undergone by the pilot, pilot navigation accuracy, or pilot decision-making/response time.

In some implementations, the data-interpretation system 100 includes an AI infrastructure trained to associate at least one flight outcome with one or more flight parameters. By way of example and not limitation, the AI infrastructure may be at least partially trained using a RandomForestClassifier or similar machine-learning (ML) model to predict the outcome of a flight based on one or more flight parameters received from the data source 105 executing the flight simulator. In some aspects, once trained, the AI infrastructure can receive new data comprising one or more flight parameters for a current flight simulation being performed by a user 120, predict one or more outcomes of the simulated flight based on the received flight parameters, use the predictions to determine one or more assessments or evaluations comprising one or more interpretations of the parameters of the simulated flight, generate at least one representation 115 of the interpretations, and present the representations to the user 120. In some implementations, the data interpretations and representations 115 may be generated by the AI infrastructure and presented to the user substantially in real time upon completing a simulated flight.

In some embodiments, data source 105 includes a computing device executing a simulator or courseware, or any similar apparatus, mechanism, resource, or technology that may be used to train or educate at least one trainee, student, or other user 120 to operate or otherwise utilize one or more vehicles, machines, systems, or system components. By way of example and not limitation, a data source 105 may comprise a computer executing a simulator or courseware configured to train users 120 to operate one or more of: a submersible vehicle, a watercraft, an aircraft or other aerial vehicle, a spacecraft or satellite, any logistical system or component, or any land-based vehicle, such as a semi-truck, a combat vehicle (e.g., a tank), a car, a truck, a van, or a motorcycle. In some implementations, the data-interpretation system 100 may be utilized to train or educate users 120 in a military or commercial environment or setting.

FIG. 2 illustrates an example of data 230 received from a data source of a data-interpretation system, such as data-interpretation system 100 of FIG. 1. In some aspects, the data-interpretation system 100 may be configured to track, monitor, or record data 230 comprising or related to one or more parameters 235 that are relevant and/or useful to generating at least one data interpretation that may be relevant, helpful, or beneficial to a user 120. As a non-limiting illustrative example, the computing device 110 may be configured to receive data 230 from a data source 105 comprising a secondary computing device running a flight-simulator program. In some implementations, the data-interpretation system 100 may be configured to track, monitor, or record various flight parameters 235 as a user 120 completes a simulated flight or similar exercise of the flight-simulator program. By way of example and not limitation, the flight parameters 235 may comprise: a flight-identification number, an aircraft altitude, an aircraft air speed, an aircraft vertical speed, an aircraft pitch, aircraft roll, aircraft yaw, and/or a quantity of evasive maneuvers performed by the user 120.

In some implementations, the data-interpretation system 100 is configured to generate at least one interpretation of data 230 received from the data source 105 based at least partially on one or more of the parameters 235. In some aspects, the data interpretation may be at least partially facilitated by at least one AI infrastructure. In some embodiments, the AI infrastructure may be configured to predict one or more outcomes based on one or more assessments, evaluations, operations, calculations, or similar analytical functions executed or performed on the data 230 received from data source 105. In some aspects, the predicted outcome(s) may form the basis of one or more interpretations of the data generated or determined by the data-interpretation system 100, wherein the interpretations may be presented to a user 120 of the data interpretation-system 100 in the form of one or more semantic, graphical, or image-based representations 115.

As a non-limiting illustrative example, by monitoring flight parameters 235 such as air speed, altitude, and/or evasive-maneuver count during a flight simulation performed by a user 120, the AI infrastructure of the data-interpretation system 100 might predict or determine that the simulated flight would likely have resulted in an unsuccessful aerial mission. This interpretation of the flight parameters 235 may cause the data-interpretation system 100 to generate a semantic representation 115 of the interpretation in the form of text stating: "Pilot requires more training. Pilot should monitor air speed and altitude during evasive maneuvers to avoid engine stall." In some aspects, this immediate personalized feedback to the user 120 may expedite the user's training, which may help a user 120 obtain a license or certification in a reduced amount of time.

Figure 3:
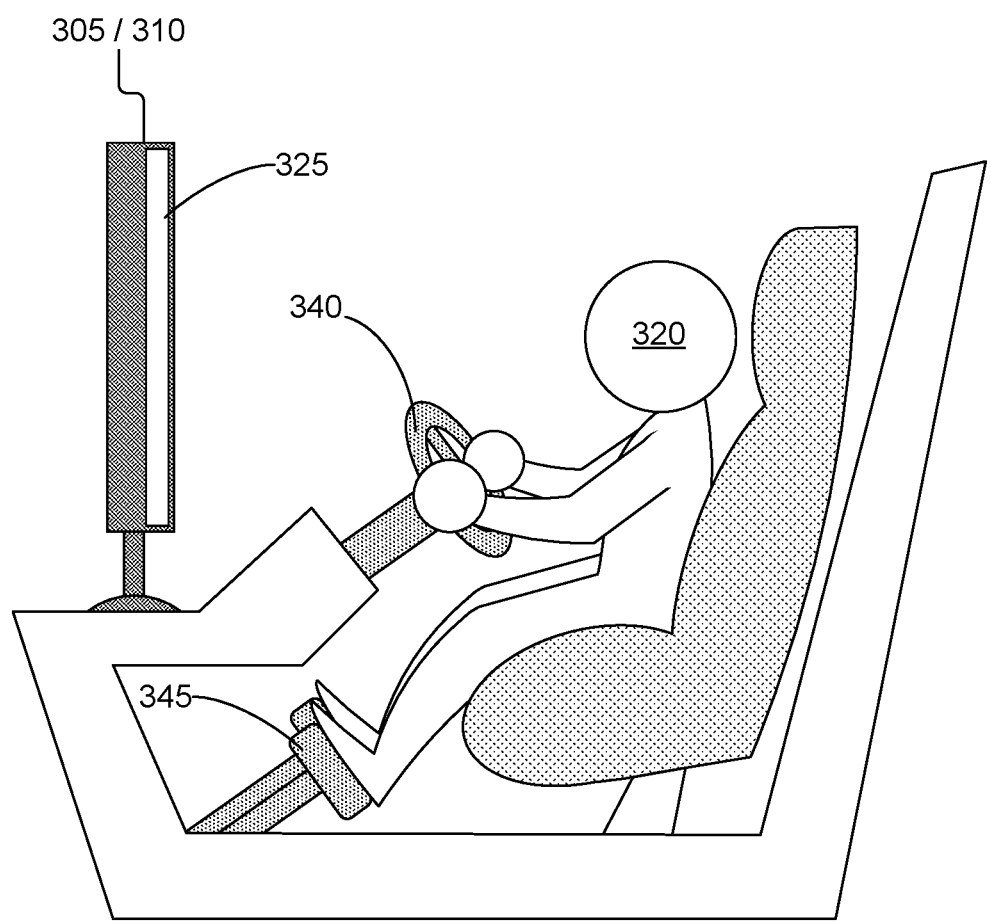
FIG. 3 illustrates another example of the data-interpretation system of FIG. 1, according to some embodiments of the present disclosure.

FIG. 3 illustrates an example data-interpretation system 300, which is an example of data-interpretation system 100 of FIG. 1. In some aspects, the data-interpretation system 300 may be utilized in an environment that comprises a simulated user experience to provide real-time instructional or performance-based feedback to the user. In some non-limiting examples, the data-interpretation system 300 may be used in a gaming environment, wherein competitive gamers 320 may benefit from learning skills to beat competitive gamers and win large monetary or other prizes or rewards.

In some implementations, the data-interpretation system 300 may comprise at least one computing device 305/310 that comprises at least one display screen 325, as well as one or more input devices communicatively coupled to the computing device 310, such as a steering wheel 340, foot pedals 345, a joystick, a pointing device, or a keyboard, as non-limiting examples. In some aspects, the computing device 310 may comprise at least one AI infrastructure, or the computing device 310 may be communicatively coupled to one or more servers that comprise at least one AI infrastructure, such that the AI infrastructure may be configured to receive data generated as a user 320 engages with the computing device 310 to participate in a gaming experience. In some embodiments, the AI infrastructure may be configured to generate one or more interpretations based at least partially on the received data and generate and present a representation of the data interpretations to the user 320 substantially in real time upon completing a gaming session.

In some aspects, the AI infrastructure of the data-interpretation system 300 may be configured to generate at least one data interpretation based at least partially on an assessment of one or more parameters of a user's performance and determine what the user 320 could have done differently to achieve a different outcome. By way of example and not limitation, the user 320 may compete in a virtual gaming experience that simulates an automobile race. In some aspects, the user may lose the race, and the data-interpretation system 300 may assess one or more parameters of the user's performance that comprise data pertaining to the speed with which the user 320 approached sharp turns. In some embodiments, the AI infrastructure of the data-interpretation system 300 may predict that if the user 320 decreased the speed with which a turn is approached, the user 320 would retain greater control of the virtual automobile and thereby decrease the user's overall race time. In some implementations, this interpretation of the data may be presented to the user 320 in a text-based representation generated by the data-interpretation system 300 that states "Decrease turn approach speed, then accelerate through the turn." In some aspects, this personalized insight may enable the user 320 to immediately identify a way to improve without spending days, weeks, or months trying to self-diagnose the problem.

Figure 4:
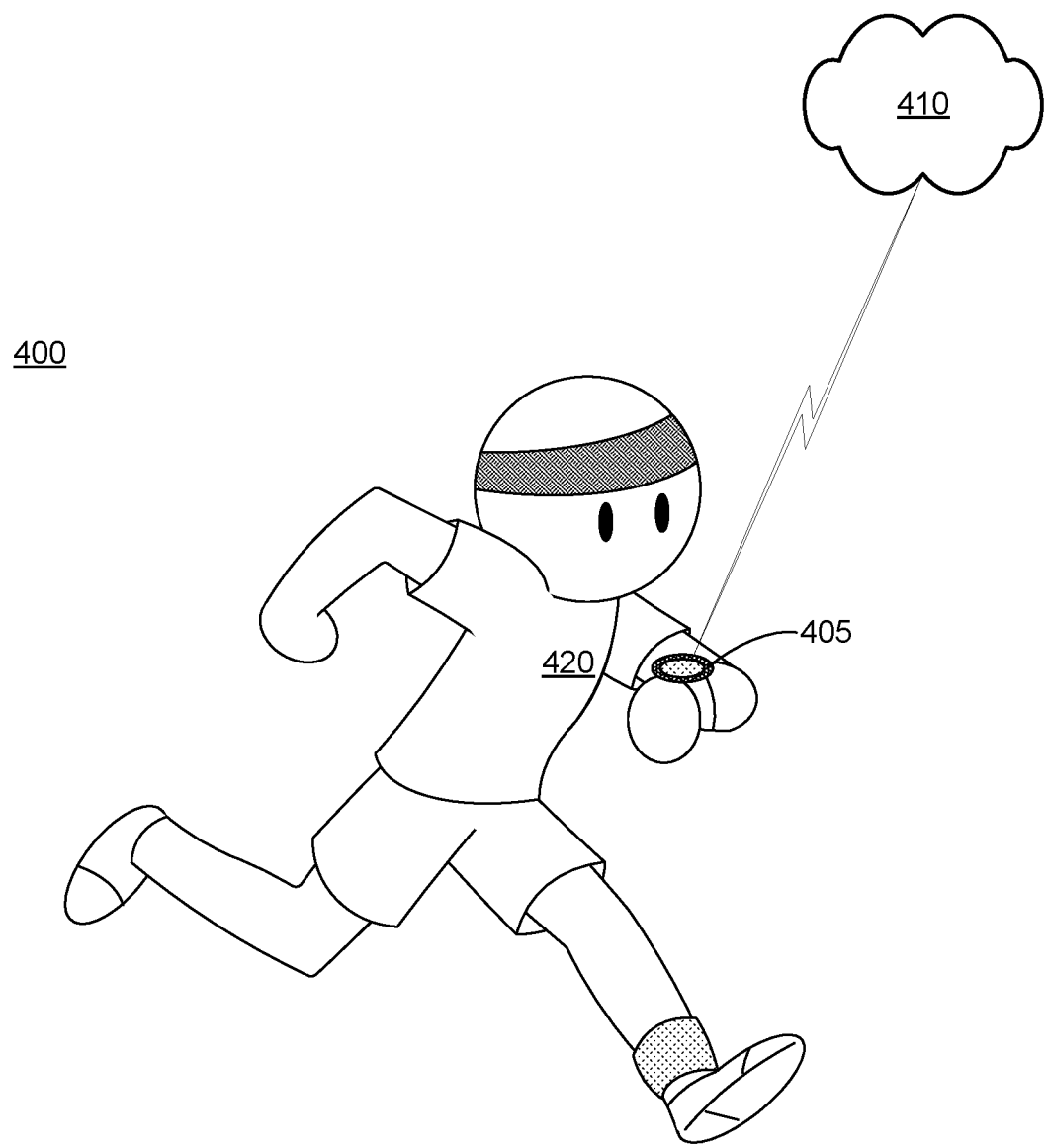
FIG. 4 illustrates another example of the data-interpretation system of FIG. 1, according to some embodiments of the present disclosure.

FIG. 4 illustrates an example data-interpretation system 400, which is another example of data-interpretation system 100 of FIG. 1. In some aspects, the data-interpretation system 400 includes a computing device in the form of one or more remote servers 410 configured to obtain or receive data from a data source 405 in the form of a wearable computing device. In some examples, data source 405 may comprise one or more fitness devices, trackers, or monitors. By way of example and not limitation, each data source 405 may comprise one or more of: a smartwatch, or one or more clothing items comprising one or more sensors, such as a headband, an ankle brace, a shirt, or shoe-sole inserts. In some implementations, sensors within the clothing item(s) may be configured to sense or detect various biometric or other features of a user during a workout, including heart rate, breathing pattern, pulse, perspiration, body movement, body position, or blood pressure, as non-limiting examples.

In some aspects, by monitoring user biometric data during physical activity, the data-interpretation system 400 may be able to provide real-time feedback to the user 420 to help the user improve workout effectiveness or athletic performance. As a non-limiting illustrative example, by monitoring a user's stride pattern and heart rate while running or jogging, an AI infrastructure of the data-interpretation system 400 may be able to predict that if the user's gait was modified to take longer strides, the user 420 could cover more distance while exerting less effort, thereby increasing the duration during which the user can maintain a maximum pace. In some implementations, a semantic representation of this data interpretation may be broadcast to the user 420 via audio emitted from a speaker in the user's smartwatch 405 that verbalizes the phrase "Taking longer strides may decrease lap time."

Figure 5:
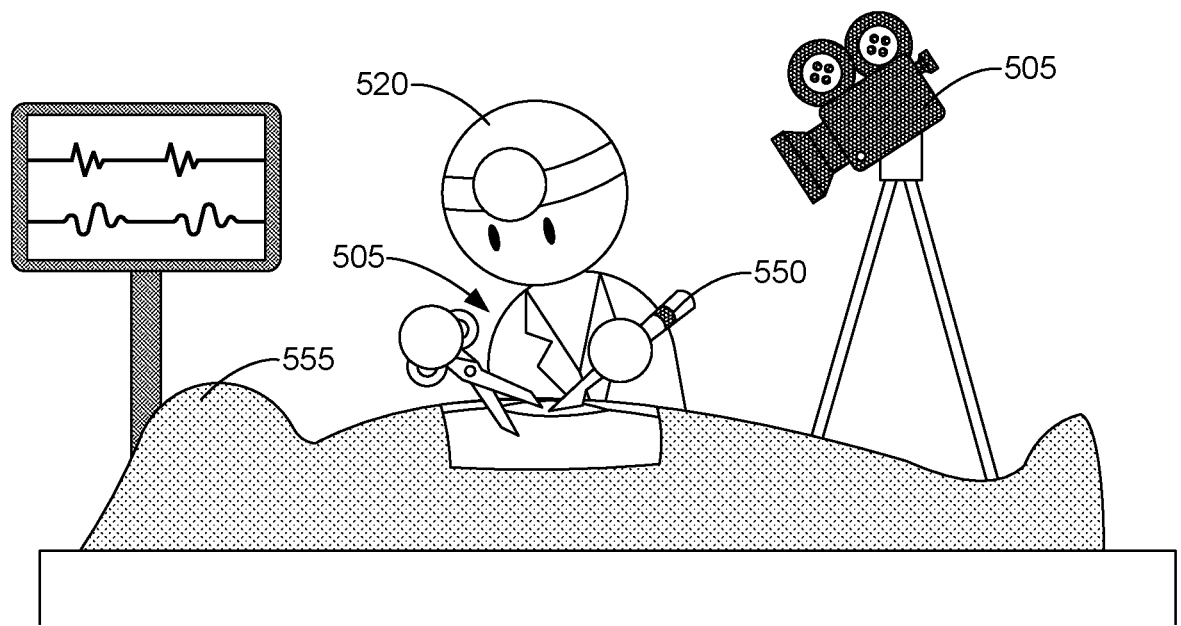
FIG. 5 illustrates another example of the data-interpretation system of FIG. 1, according to some embodiments of the present disclosure.

FIG. 5 illustrates an example data-interpretation system 500, which is another example of data-interpretation system 100 of FIG. 1. In some aspects, the data-interpretation system 500 may be utilized in one or more educational training exercises, wherein the data-interpretation system 500 includes one or more data sources 505 in the form of tools, utensils, or devices embedded or integrated with one or more sensors that indicate how the devices are being moved, used, positioned, or handled. By way of example and not limitation, sensors in the form of motion detectors and/or accelerometers may indicate when a device 505 is moved or the trajectory of motion in which the device travels, which may facilitate a determination of how the device is used. In some embodiments, a data source 505 may also comprise a camera or similar visual-capture device, wherein the data-interpretation system 500 may be configured to analyze captured image data to assess or evaluate a user's performance and form or generate one or more interpretations based at least partially on the received image data.

As a non-limiting illustrative example, the data-interpretation system 500 may be implemented in a medical training program. In some aspects, the data-interpretation system 500 may comprise a plurality of data sources 505 in the form of cameras and medical tools and utensils with integrated sensors. In some implementations, the data-interpretation system 500 may comprise at least one AI infrastructure configured to receive data from the data sources 505 and predict one or more outcomes that facilitate the generation of at least one interpretation of the data. By way of example and not limitation, a scalpel 550 embedded with one or more sensors in the form of accelerometers may allow the AI infrastructure of the data-interpretation system 500 to determine that the user 520 awkwardly fumbles the scalpel 550 based on poor finger technique while practicing a procedure on a cadaver 555, and so the data-interpretation system 500 may be able to provide real-time feedback to the user 520 to improve surgical performance without needing an instructor present to witness the procedure and assess the user 520.

Figure 6:
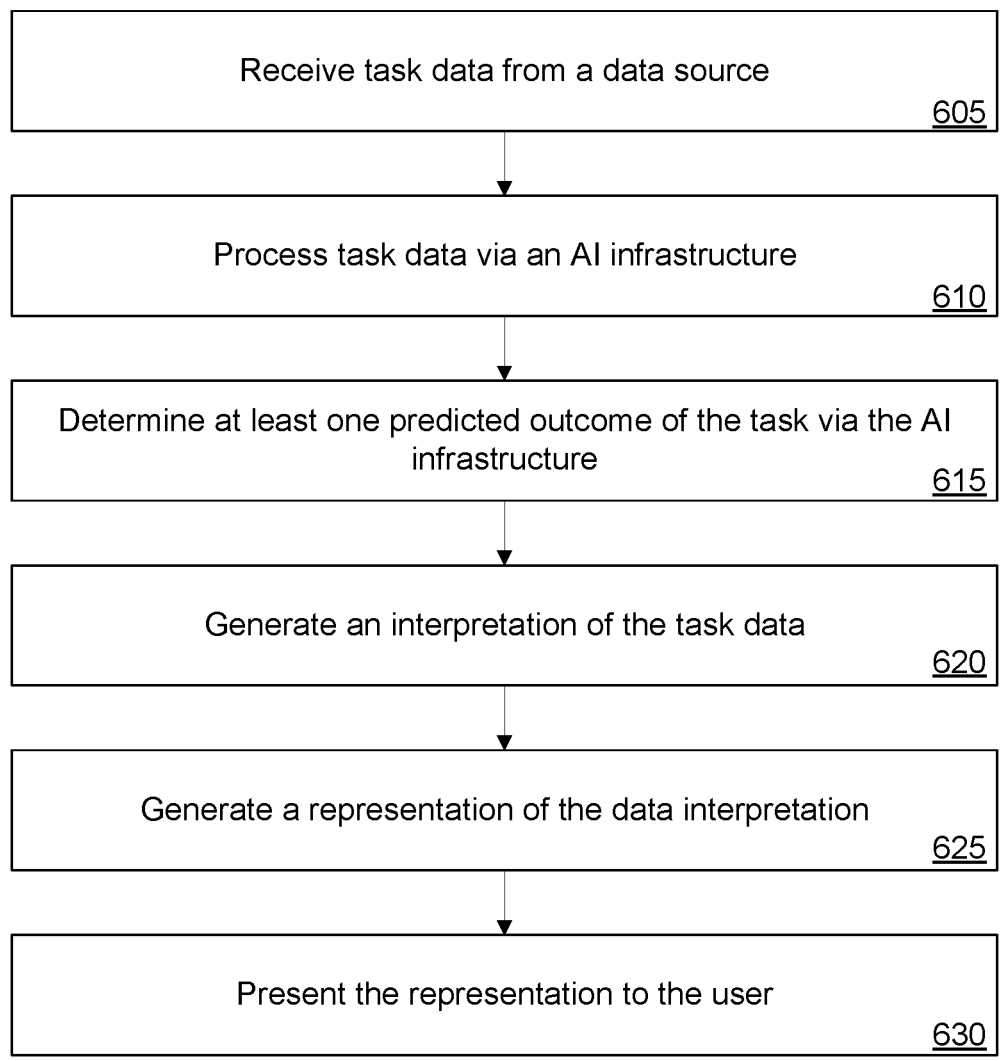
FIG. 6 is a flowchart illustrating a process for facilitating data interpretation, according to some embodiments of the present disclosure.

FIG. 6 is a flowchart illustrating an example process 600 for interpreting data, in accordance with some techniques of the present disclosure. In some aspects, process 600 may be at least partially facilitated and/or implemented by a data-interpretation system, such as those described above.

At Step 605, task data is received, whether directly or indirectly, from a data source. For instance, task data may be received from the data source via a data collector configured to aggregate or compile the task data. In some implementations, the data source is configured to generate, transmit, produce, and/or relay task data that pertains to the performance of at least one user while performing a task. By way of example and not limitation, the task data may pertain to a user's physical performance, mental performance or knowledge, or decision-making skills.

At Step 610, the received task data is propagated through, or otherwise processed by, an AI infrastructure. In some implementations, the AI infrastructure is trained to execute one or more operations or analytical functions to predict one or more outcomes of the task based at least partially on the received task data.

At Step 615, the AI infrastructure determines at least one predicted outcome for the task, based at least partially on the received task data. For instance, the AI infrastructure may be trained via at least one machine-learning process to associate one or more predictable outcomes with task data comprising one or more different parameters. In some embodiments, the AI infrastructure is configured to reference one or more metrics stored in at least one digital storage medium communicatively coupled to the AI infrastructure in determining the predicted outcome of the tasks, wherein the stored metrics may influence a relative weight or importance that the AI infrastructure assigns to each task-data parameter. As a non-limiting illustrative example, a data source may comprise a computer running a flight simulator, and one or more metrics indicative of physical specifications (e.g., wingspan, weight, or engine size) of the simulated aircraft may influence the relative weight with which the AI infrastructure processes task-data parameters such as air speed or altitude.

At Step 620, the AI infrastructure generates at least one interpretation of the task data, based at least in part on the predicted outcomes. By way of example and not limitation, if the predicted outcomes are generally negative (e.g., a failed task), the data interpretation may comprise an assessment of a need for modification or improvement.

At Step 625, the AI infrastructure generates a representation of the data interpretation. In some implementations, the representation may comprise a semantic or text-based form, or a graphical or image-based form. In some embodiments, the representation is configured to be presented in "layman's terms" without requiring specialized knowledge to be understood by a user. This enables the user to easily understand the data interpretation and receive feedback without needing a specialized instructor, teacher, or mentor, which may reduce the amount of time and cost required for the user to receive effective training. At Step 630, a display screen integrated with or communicatively coupled to at least one computing device presents the generated representation to the user.

Figure 7:
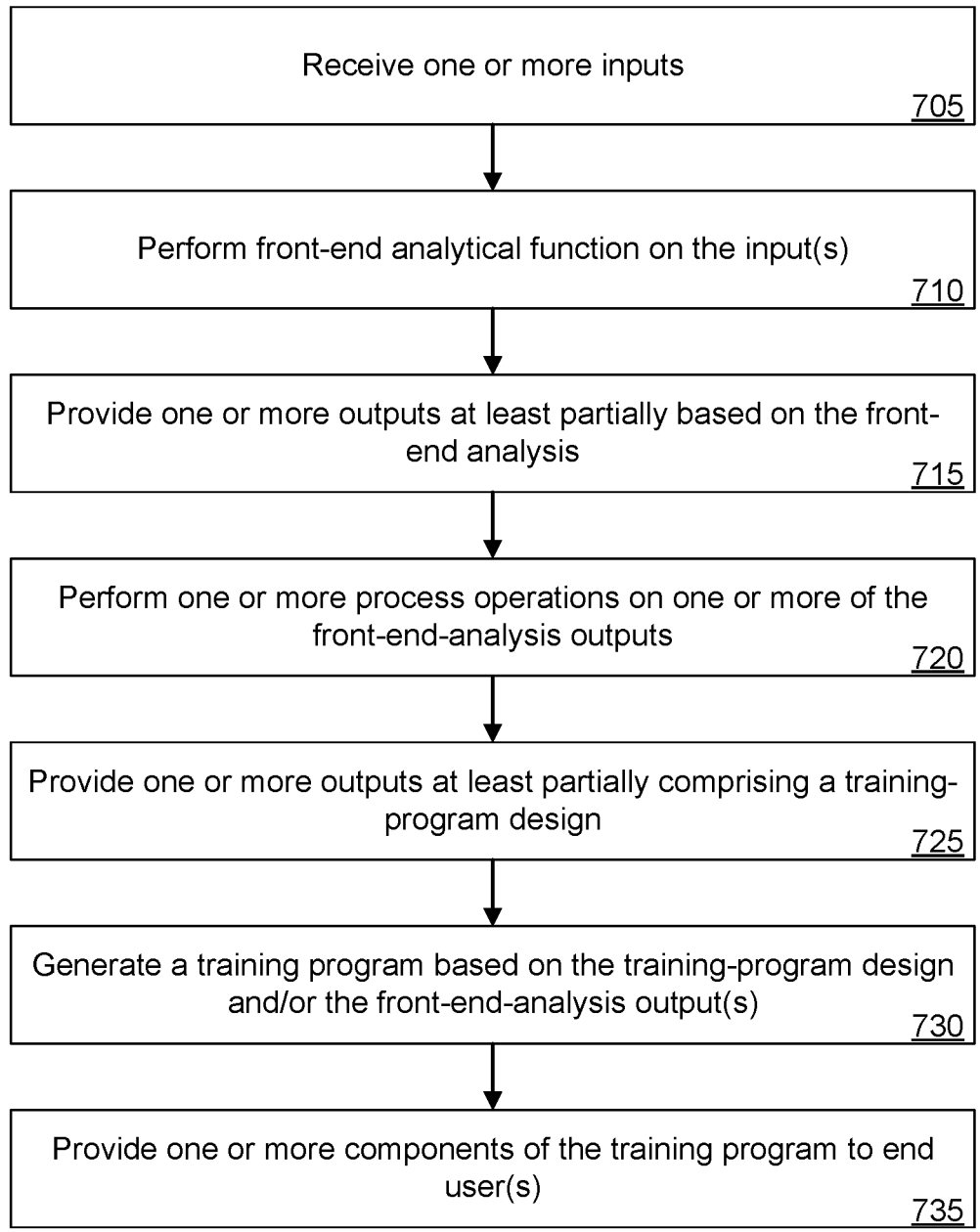
FIG. 7 is a flowchart illustrating a process for generating a training program configured for use with a data interpretation system, according to some embodiments of the present disclosure.

FIG. 7 is a flowchart illustrating an example process 700 for generating a training program configured for use in conjunction with a data-interpretation system, according to some embodiments of the present disclosure. In some implementations, process 700 is at least partially facilitated and/or implemented by the data-interpretation system, such as any of those described above.

At Step 705, one or more inputs are received. By way of example and not limitation, the received input(s) may comprise one or more of: a work-performance statement, one or more portions of an operating manual (e.g., an aircraft flight-crew operating manual), one or more portions of a quick-reference handbook (e.g., an aircraft quick-reference handbook), one or more relevant checklists (e.g., an aircraft flight and/or mission crew checklist), a pilot electronic flight bag/application, one or more portions of a training manual (e.g., an aircraft flight crew training manual), one or more portions of a relevant maintenance manual (e.g., an aircraft maintenance manual), data from a relevant computing device (e.g., an aircraft technician/mechanic computing device), one or more relevant maintenance and/or repair task sheets or checklists (e.g., an aircraft maintenance remove-and-repair task sheet or checklist with pass/fail criteria), or data from a relevant qualification or certification test (e.g., an aircraft flight qualification/certification test). In some embodiments, the data inputs may be received according to their availability.

At Step 710, at least one front-end analytical function is executed or performed on the received input(s). At Step 715, one or more outputs are provided that are at least partially based on the front-end analysis performed in Step 710. By way of example and not limitation, the output(s) may comprise one or more of: a subsystem and one or more derived requirements for the design of a training program (e.g., a simulator or courseware), training-program-instructor operating-station malfunctions used or created for emergency procedures training, identified training-program usage data to be collected during use of a training program to evaluate a user, and/or identified training-program usage data to be collected during use of a training program to evaluate one or more aspects of the training program itself.

At Step 720, one or more process operations are performed on the front-end-analysis outputs. In some examples, the process operations at least partially include the creation or generation of at least one training-program design configured to satisfy, implement, or correspond to one or more of the front-end-analysis outputs.

At Step 725, one or more outputs are provided that at least partially comprise the training-program design. The provided output(s) may comprise: one or more types of training program material, content, or resources that may be used by a training program teacher or instructor (e.g., non-simulator courseware material and/or simulator courseware material), simulator hardware technical-design data, and/or simulator-software technical data.

At Step 730, a training program is generated, at least partially based on: the training-program design output(s) provided at Step 725, one or more of the front-end-analysis outputs, and/or one or more of the front-end-analysis inputs. At Step 735, one or more components of the generated training program are provided to one or more end users. By way of example and not limitation, the training-program component(s) may comprise: one or more courseware instructional system design software application modules to use for one or more trainees or students, one or more courseware instructional system design evaluation tests configured to evaluate or assess one or more trainees or students, one or more portions or components of simulator hardware integrated with simulator software, one or more simulator qualification-test guides, and/or one or more simulator acceptance-test procedures.

Figure 8:
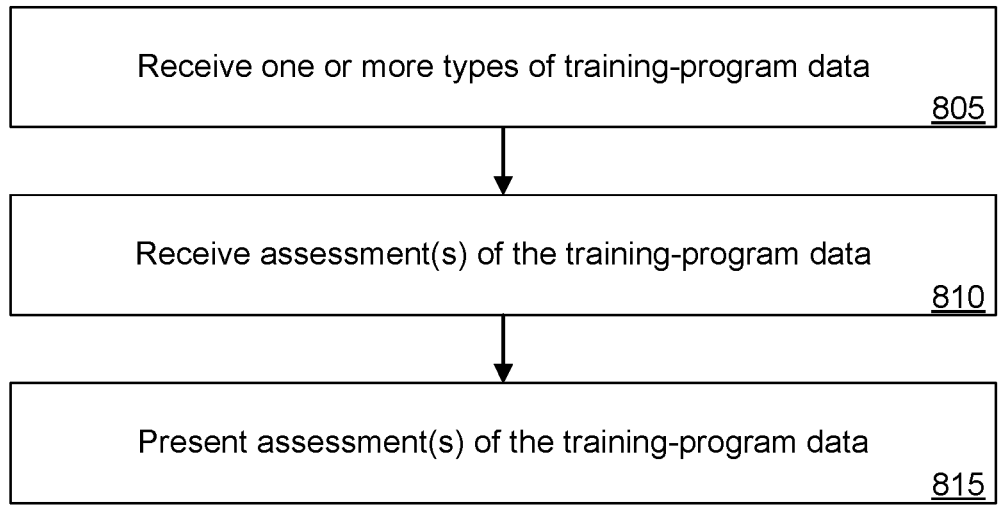
FIG. 8 is a flowchart illustrating a process for assessing a user of a data-interpretation system, according to some embodiments of the present disclosure.

FIG. 8 is a flowchart illustrating an example process 800 for assessing a user of a data-interpretation system, according to some embodiments of the present disclosure. In some implementations, process 800 is at least partially facilitated and/or implemented by the data-interpretation system. For instance, process 800 may be used to assess a user of a training program configured for use in conjunction with a data-interpretation system.

At Step 805, one or more types of training-program data are received. By way of example and not limitation, training-program data may at least partially comprise one or more training program records for one or more trainees, students, or other users, such as written test scores, practical test scores, teacher or instructor notes or remarks from simulator sessions, objective result records from simulator check ride session, and/or one or more simulator oral check ride type rating/-10 operating manual standardization scores.

At Step 810, an assessment of the training-program data is received. By way of example and not limitation, the assessment may be received from an instructor, teacher, or mentor of at least one trainee, student, or other user, wherein the assessment includes a determination by the instructor as to whether the training program record(s) for the trainee or student satisfy one or more "pass" criteria thresholds or standards.

At Step 815, one or more assessments of the training-program data are presented. In some embodiments, the assessment(s) are presented via a display screen integrated with or communicatively coupled to a computing device. In some examples, the assessment(s) at least partially include a determination as to whether a trainee or student passed or failed one or more portions of a training program.

Figure 9:
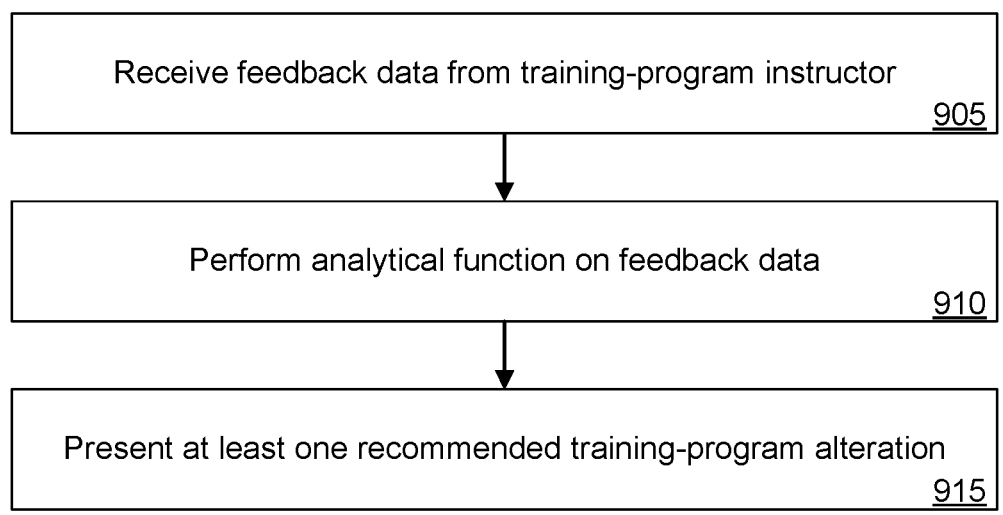
FIG. 9 is a flowchart illustrating a process for providing one or more alterations for a training program configured for use with a data-interpretation system, according to some embodiments of the present disclosure.

FIG. 9 is a flowchart illustrating an example process 900 for altering a training program configured for use with a data-interpretation system, according to some embodiments of the present disclosure. In some implementations, process 900 is at least partially facilitated by a data-interpretation system.

At Step 905, feedback data is received from a training-program instructor or teacher. For instance, the feedback data may include one or more aspects of the instructor's experience from teaching a training program, such as courseware and/or simulator sessions.

At Step 910, one or more analytical functions are executed or performed on the teacher or instructor feedback data. In some examples, the analytical function(s) are configured to identify or determine one or more recommended alterations to the training program based at least partially on the instructor's feedback data, such as one or more courseware changes and/or simulator-session changes. At Step 915, at least one recommended training-program alteration is provided or presented, e.g., via a display screen integrated with or communicatively coupled to a computing device.

Figure 10:
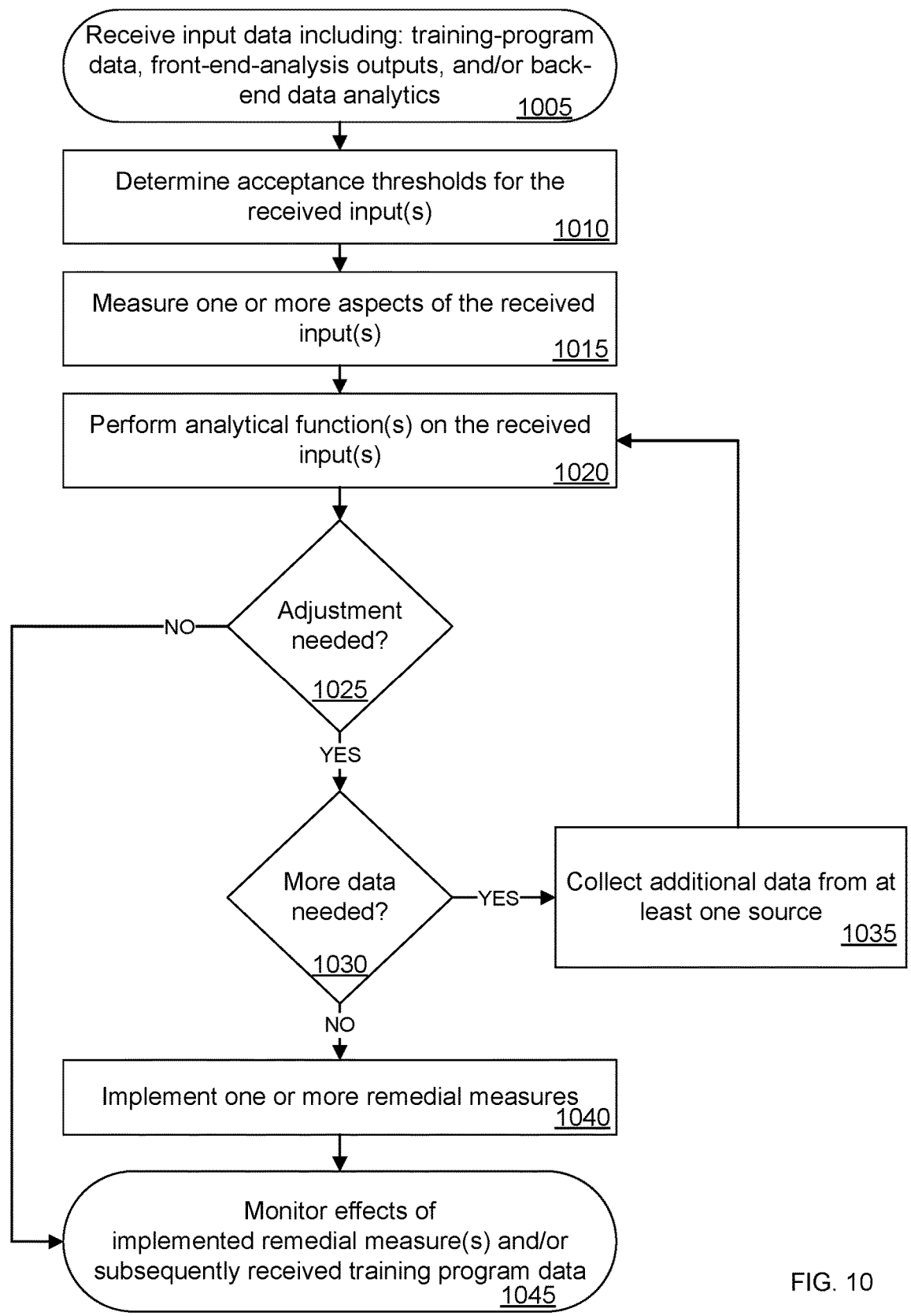
FIG. 10 is a flowchart illustrating a process for facilitating improvement of a training program configured for use with a data-interpretation system, according to some embodiments of the present disclosure.

FIG. 10 is a flowchart illustrating an example process 1000 for improving a training program configured for use with a data-interpretation system, according to some embodiments of the present disclosure. In some implementations, process 1000 is at least partially facilitated and/or implemented by a data-interpretation system.

At Step 1005, one or more inputs are received. By way of example and not limitation, the received input(s) may comprise: one or more types of training-program data, front-end-analysis outputs, and/or one or more back-end data analytics. In some examples, training-program data includes training-program records for at least one trainee, student, or other user, or one or more types of data or datasets associated with usage of a training program, such as collected courseware-usage data or collected simulator-usage data.

At Step 1010, one or more acceptable thresholds are determined for the received input(s). At Step 1015, one or more aspects of the received input(s) are measured. For instance, the received input(s) may be measured using back-end data analytics.

At Step 1020, one or more analytical functions are executed or performed on the received input(s). In some examples, the analytical function(s) are at least partially facilitated by: data-analysis tools integrated or associated with a data-interpretation system, data-analysis tools available from a third party, and/or custom data-analysis tools. By way of example and not limitation, the data-analysis tool(s) may be selected or configured to facilitate the generation of: a scatter diagram of one or more dataset items associated with or derived from the received input(s), a Pareto chart or Pareto analysis of one or more dataset items associated with or derived from the received input(s), and/or any similar data-analysis results, summaries, structures, insights, or formats. In some examples, two or more dataset items may be aggregated prior to performing analytical functions thereon.

At Step 1025, at least one determination is made as to whether any adjustments are needed for the training program(s) associated with the input data received at Step 1005. For instance, one or more dataset items associated with the training program(s) may be identified or selected for improvement based at least partially on the analytical function(s) performed at Step 1020. In some examples, a cause-and-effect correlation and/or model of characterization of the dataset items may be generated or received in order to at least partially facilitate a determination or identification of one or more dataset items that require improvement. In some examples, a root-cause analysis may be performed using one or more data-analysis tools to at least partially facilitate a determination or identification of one or more dataset items that require improvement. In some examples, an identification may be made as to whether any dataset item(s), identified or determined to require improvement, pertain to a courseware portion or a simulator portion of the relevant training program(s) being analyzed.

In some implementations of process 1000, a determination is made that one or more training-program adjustments are needed ("YES" branch from Step 1025), and process 1000 proceeds to Step 1030. In other implementations, a determination is made that no training-program adjustments are needed ("NO" branch from Step 1025), and process 1000 proceeds to Step 1045.

At Step 1030, a determination is made as to whether more data is needed to adequately assess the training program(s) being analyzed. Such determination may be at least partially based on whether any of the data-analysis tool(s) performing the analytical function(s) on the received input data failed to generate complete, adequate, and/or sufficient results. A positive determination ("YES" branch from Step 1030) causes process 1000 to proceed to Step 1035, while a negative determination ("NO" branch from Step 1030) causes process 1000 to proceed to Step 1040.

At Step 1035, additional training-program data is received from a data source. At Step 1040, one or more remedial measures are implemented. For instance, the implemented remedial measure(s) may be at least partially based on the datasets identified or determined at Step 1025 to be in need of improvement.

At Step 1045, one or more effects of the implemented remedial measure(s) and/or any subsequently received training-program data input(s) are monitored. For instance, the remedial measures implemented at Step 1040 may be continuously, routinely, or otherwise regularly tracked or monitored to verify that they are and remain useful and effective, such as by collecting additional training-program data or instructor-feedback data.

Figure 11:
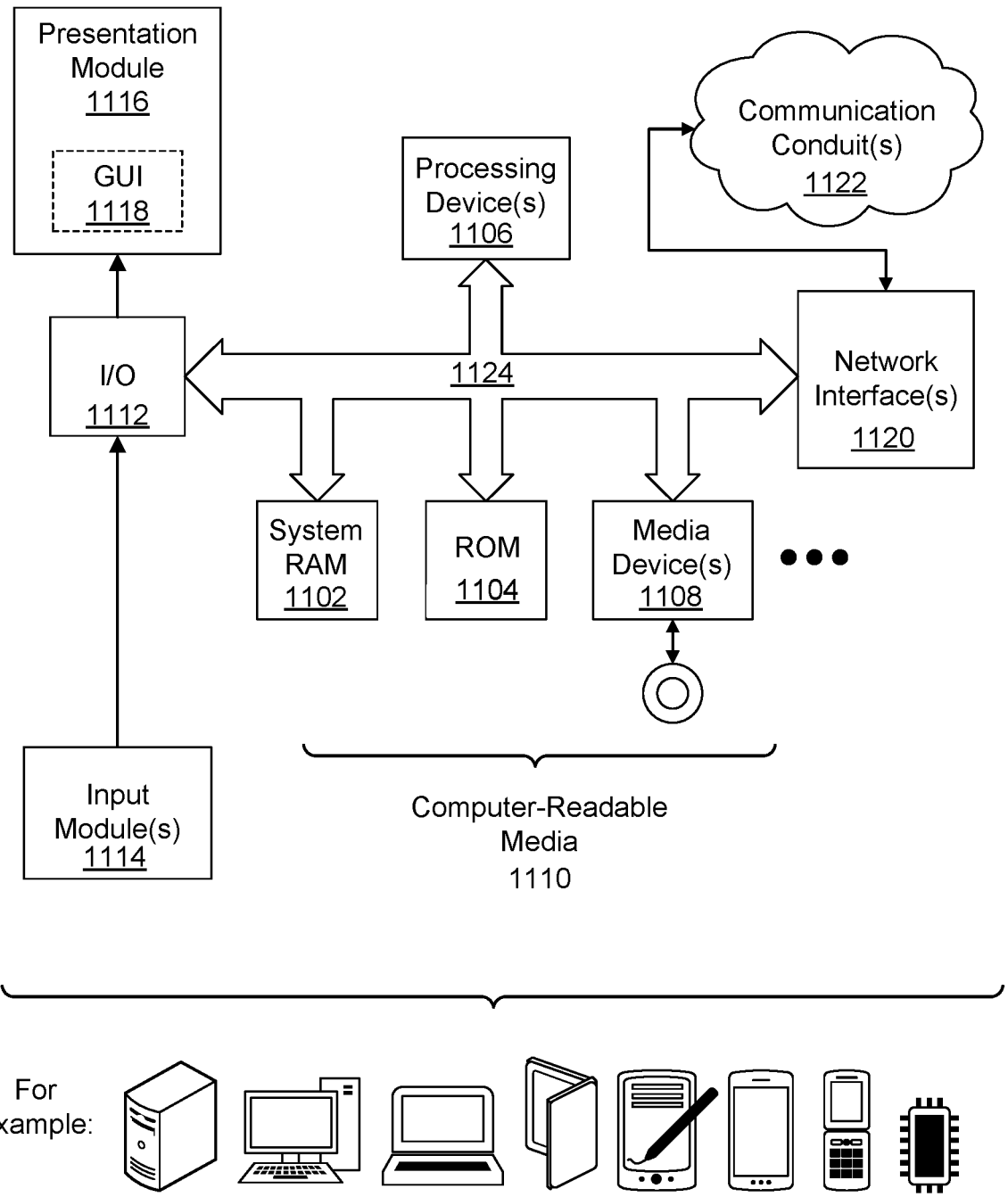
FIG. 11 is a conceptual diagram of an example computing system that may be used to implement one or more aspects of the data-interpretation system of FIG. 1, according to some embodiments of the present disclosure.

FIG. 11 is a conceptual block diagram of an example computing system 1100 that may be used to implement one or more aspects of a data-interpretation system, as described above. Computing system 1100 can include volatile and non-volatile memory, such as random-access memory (RAM) 1102 and read-only memory (ROM) 1104, as well as one or more processing devices 1106 (e.g., central processing units (CPUs), graphical processing units (GPUs), and the like). Computing system 1100 can include various media devices 1108, such as a hard-disk module, an optical-disk module, and so forth. Computing system 1100 may perform any of all of the computer-based operations described throughout this disclosure by processing device(s) 1106 executing instructions stored in memory (e.g., RAM 1102, ROM 1104, and the like).

More generally, instructions and other program information may be stored on any computer-readable medium 1110, including, but not limited to, static-memory storage devices, magnetic storage devices, and optical storage devices. The term "computer-readable medium" also encompasses plural storage devices. In all cases, computer-readable medium 1110 represents some form of physical and tangible entity. By way of example and not limitation, computer-readable medium 1110 may comprise "computer storage media" and "communications media."

"Computer storage media" comprises volatile and non-volatile, removable and nonremovable media implemented in any suitable method or technology for storage of information, such as computer-readable instructions, data structures, program modules, or other data. Computer storage media may be, for instance, RAM 1102, ROM 1104, EEPROM, Flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by a computer.

"Communication media" typically includes computer-readable instructions, data structures, program modules, or other data in a modulated data signal, such as carrier wave or other transport mechanism. Communication media may also comprise any information-delivery media. The term "modulated data signal" means a signal that has one or more of its characteristics set or changed in such a manner as to encode information in the signal. By way of example, and not limitation, communication media comprises wired media such as wired network or direct-wired connection, and wireless media such as acoustic, RF, infrared, and other wireless media. Combinations of any of the above are also included within the scope of "computer-readable medium."

Computing system 1100 includes an input/output (I/O) module 1112 for receiving various inputs (via input modules 1114), and for providing various outputs (via one or more output modules). One particular output module mechanism may be a presentation module 1116 and an associated GUI 1118. Computing system 1100 may also include one or more network interfaces 1120 for exchanging data with other devices via one or more communication conduits 1122. In some aspects, one or more communication buses 1124 communicatively couple the above-described components together.

Communication conduit(s) 1122 may be implemented in any manner, such as via a local-area network (LAN), a wide-area network (WAN, e.g., the Internet), and the like, or any suitable combination thereof. Communication conduit(s) 1122 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components, such as Field-Programmable Gate Arrays (FPGAs), Application-Specific Integrated Circuits (ASICs), Application-Specific Standard Products (ASSPs), Systems-on-a-Chip (SOCs), Complex Programmable Logic Devices (CPLDs), and the like.

The terms "service," "module," and "component" as used herein generally represent software, firmware, hardware, or any combination thereof. In the case of a software implementation, the service, module, or component represents program code that performs specified tasks when executed on one or more processors. The program code may be stored in one or more computer readable memory devices. The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A data interpretation system comprising:
   at least one data source;
   at least one computing device, wherein the at least one computing device is communicatively coupled to the at least one data source, wherein the at least one computing device is configured to compile at least one datum to prepare the at least one datum for transmission and/or analysis based on at least a plurality of a performance work statement, one or more portions of an operating manual, one or more portions of a quick reference handbook, one or more relevant checklists, a pilot electronic flight bag/application, one or more portions of a training manual, one or more portions of a relevant maintenance manual, at least one datum from a relevant computing device, one or more relevant maintenance and/or repair task sheets or checklists with pass/fail criteria, or at least one datum from a relevant qualification or certification test, wherein the transmission or analysis process facilitates bulk transmission or analysis of the at least one datum, wherein the at least one computing device monitors flight parameters including a plurality of an identification number for the flight simulation, aircraft altitude, aircraft air speed, aircraft heading, aircraft vertical speed or change in altitude rate, aircraft pitch, aircraft roll, aircraft yaw, experienced G-forces, percentage of afterburner usage during the flight, number of midsole launches during the flight, number of training hours previously undergone by the pilot, pilot navigation accuracy, or pilot decision making time; and
   at least one artificial intelligence infrastructure, wherein the at least one artificial intelligence infrastructure is configured to determine one or more predicted outcomes based on at least one datum received from the at least one data source, wherein the at least one artificial intelligence infrastructure is configured to identify or determine one or more recommended alterations to at least one training program, wherein the at least one artificial intelligence infrastructure is configured to generate at least one presentable representation of a data interpretation at least partially comprising one or more of: a textual, graphical, or image-based representation of the data interpretation presented to one or more users via at least one graphical user interface generated and presented by the computing device, and wherein the data interpretation and the at least one presentable representation is generated by the at least one artificial intelligence infrastructure and presented to the one or more users in real time upon completing a simulated flight.

2. The data interpretation system of claim 1, further comprising at least one storage medium comprising one or more stored metrics, including one or more derived requirements for a design of at least one training program one or more training program instructor operating station malfunctions for emergency procedures training, at least one identified training program usage datum to be collected during use of a training program to evaluate a user, or at least one identified training program usage datum to be collected during use of a training program to evaluate one or more aspects of the training program.

3. The data interpretation system of claim 2, wherein the at least one storage medium is communicatively coupled to the at least one artificial intelligence infrastructure, and the at least one artificial intelligence infrastructure is configured to reference the one or more stored metrics while determining the one or more predicted outcomes.

4. A method for facilitating data interpretation, the method comprising:
   receiving input parameters comprising at least a plurality of a performance work statement, one or more portions of an operating manual, one or more portions of a quick reference handbook, one or more relevant checklists, a pilot electronic flight bag/application, one or more portions of a training manual, one or more portions of a relevant maintenance manual, at least one datum from a relevant computing device, one or more relevant maintenance and/or repair task sheets or checklists with pass/fail criteria, or at least one datum from a relevant qualification or certification test;
   receiving at least one datum from at least one data source;
   monitoring flight parameters including at least three of an identification number for the flight simulation, aircraft altitude, aircraft air speed, aircraft heading, aircraft vertical speed or change in altitude rate, aircraft pitch, aircraft roll, aircraft yaw, experienced G-forces, percentage of afterburner usage during the flight, number of midsole launches during the flight, number of training hours previously undergone by the pilot, pilot navigation accuracy, or pilot decision making time;
   processing the at least one datum via at least one artificial intelligence infrastructure;

compiling at least one datum to prepare the at least one datum for transmission and/or analysis, wherein the transmission or analysis process facilitates bulk transmission or analysis of the at least one datum; and determining at least one predicted simulated flight outcome via the at least one artificial intelligence infrastructure based on whether the simulated flight outcome comprises a success or failure of a simulated aerial mission based on the monitoring, wherein the at least one predicted simulated flight outcome is at least partially based on the at least one datum, wherein the at least one artificial intelligence infrastructure is configured to identify or determine one or more recommended alterations to at least one training program, wherein the at least one artificial intelligence infrastructure is configured to generate at least one presentable representation of a data interpretation at least partially comprising one or more of:

a textual, graphical, or image-based representation of the data interpretation presented to one or more users via at least one graphical user interface generated and presented by the computing device, and wherein the data interpretation and the at least one presentable representation is generated by the at least one artificial intelligence infrastructure and presented to the one or more users in real time upon completing a simulated flight, and wherein the at least one artificial intelligence infrastructure is configured to determine.

5. The method of claim 4, further comprising receiving one or more derived requirements for a design of at least one training program, one or more training program instructor operating station malfunctions for emergency procedures training, at least one identified training program usage datum to be collected during use of a training program to evaluate a user, or at least one identified training program usage datum to be collected during use of a training program to evaluate one or more aspects of the training program.

* * * * *